US012573256B1

(12) United States Patent
Casey

(10) Patent No.: US 12,573,256 B1
(45) Date of Patent: Mar. 10, 2026

(54) STANDALONE SOLAR POWERED FEED AND SEED VENDING SYSTEM

(71) Applicant: Payton Casey, Frisco City, AL (US)

(72) Inventor: Payton Casey, Frisco City, AL (US)

( * ) Notice: Subject to any disclaimer, the term of this patent is extended or adjusted under 35 U.S.C. 154(b) by 41 days.

(21) Appl. No.: 18/738,031

(22) Filed: Jun. 9, 2024

(51) Int. Cl.
　　*G07F 17/00* 　　(2006.01)
　　*G06Q 20/18* 　　(2012.01)
　　*H02J 7/35* 　　(2006.01)

(52) U.S. Cl.
　　CPC ............. *G07F 17/00* (2013.01); *G06Q 20/18* (2013.01); *H02J 7/35* (2013.01)

(58) Field of Classification Search
　　CPC ............. G07F 17/00; G06Q 20/18; H02J 7/35
　　See application file for complete search history.

(56) References Cited

U.S. PATENT DOCUMENTS

2017/0300068 A1　10/2017　Irwin et al.
2020/0234526 A1* 　7/2020　Ruggiero ............... G06Q 20/18
2021/0327203 A1* 10/2021　Shah ....................... G06F 21/32

FOREIGN PATENT DOCUMENTS

WO　　WO-2022133498 A1 *　6/2022　............. G06Q 30/06

* cited by examiner

*Primary Examiner* — Garcia Ade
(74) *Attorney, Agent, or Firm* — Peter Loffler

(57) ABSTRACT

A vending system uses a housing module with a series of compartments closable by a lockable door. One of the compartments is occupied by a control system that operates the locking system of the doors, accepts payments, communicates with the users, etc. A user searches via an onboard screen for the contents of the compartments to select the product desired. The user communicates the selected compartment to the control system. The control system verifies payment and thereafter sends an unlock signal to the locking system of the selected compartment, allowing retrieval therefrom. Two or more housing modules can be chained together and controlled by a single control system. The device is powered by solar power with battery backup when solar power is not being generated.

6 Claims, 5 Drawing Sheets

STANDALONE SOLAR POWERED FEED AND SEED VENDING SYSTEM

BACKGROUND OF THE INVENTION

1. Field of the Invention

The present invention relates to a standalone vending system that holds bags of feed and/or seed and other items and allows various customers such as farmers, hunters, wildlife enthusiasts, and others to obtain these products without the need to go to a human occupied outlet. The device uses a solar collector for generating all its electrical needs, the solar collector charging a battery that runs the unit.

2. Background of the Prior Art

Customers often need feed for their livestock or seed for planting on a very short notice such that having their supplier deliver the customer's needs in the normal business schedule is not optimal. In such cases, the customer goes to the local supply outlet, obtains what the customer needs, pays for the supplies, and returns to their area of concern to use the products just obtained. While this method is effective, it is not without its shortcomings. Often, the need for the feed or seed or other products occurs outside of typical business hours such as very early in the morning or late in the evening or during the weekend or a holiday. As such, the customer must wait until the outlet is staffed, which wait may adversely interfere with the customer's schedule. Additionally, in many rural communities, such outlets are few and far between and can be a considerable drive for the customer. Such a drive is both time-consuming in terms of lost productivity as well as costly in terms of fuel consumption. Such a drive can also be quite frustrating should the customer forget an item or two and must return in short order, resulting in more time and money being expended.

There needs to be a system that allows a customer to be able to obtain relatively small quantities of supplies on short notice which system overcomes the above stated shortcomings. Specifically, such a system must be usable by a person at any time of day or night irrespective of whether the particular day is a work day or a weekend or a holiday. Such a system must be set up in locations where it is convenient for rural customers without the need for infrastructure or other support systems (such as electricity) other than restocking the supplies from time to time. Such a system should be relatively simple in its implementation so that an operator of such a system can populate a given area with such a system to have an adequate dispersal density so that a given customer need not drive great distances to utilize the system. The system must be relatively simple to use and maintain.

SUMMARY OF THE INVENTION

The standalone solar powered feed and seed vending system of the present invention addresses the aforementioned needs in the art by providing a standalone vending system that is self-sufficient and can be located anywhere a customer needs the system and can dispense relatively small amounts of supplies at any time of day or night, weekdays, weekends, and holidays alike. The device relies entirely on solar power (with battery charging) so that the device is not reliant on infrastructure such as a source of an electric power from a grid or even a generator (that requires frequent refueling) so that the device can be located in relatively remote areas that are convenient to farmers in need of feed or seed. The standalone solar powered feed and seed vending system is of relatively simple design and construction, being produced using standard manufacturing techniques, so that the device is relatively inexpensive to produce making the device cost-effective to deploy with sufficient saturation of a given area so that a particular customer need not drive great distances to utilize the device. As the standalone solar powered feed and seed vending system relies on solar power for its electrical needs, the device does not need a human attendant to operate (other than restocking). By running on solar power, the operating costs of the system are relatively low. Usage of the device by the end user is simple and straightforward.

The standalone solar powered feed and seed vending system of the present invention is comprised of a housing module that has a first compartment and a series of second compartments. Each second compartment has a door covering its opening. Each door has a locking system, the locking system having a locked mode for locking the door and an unlocked mode for unlocking the door. A control system is disposed within the first compartment and is electrically coupled to each of the locking systems. A payment verification subsystem is communicatively coupled to the control system. Once a product within a particular second compartment is selected, the payment verification subsystem verifies that a payment has been made for that compartment's contents and communicates this payment fact to the control system wherein the control system sends a signal to the locking system associated with the selected second compartment to thereby place the locking system of that second compartment into its unlocked mode, so as to allow a user to open the door to that compartment and access the contents therein. The control system is controlled via a touch screen communicatively coupled to the control system—or can be controlled from an app residing on a user's handheld electronic device such as a smartphone. A solar collector is electrically coupled to the control system and to each of the locking systems, via a battery, for providing a source of electrical power for the control system and each of the locking systems. The solar collector charges the battery which runs the various systems of the device. One or more additional housing modules can be electrically connected to the first housing module. Each additional housing module has a series of second compartments that are also controlled via the control system residing in the first housing module.

BRIEF DESCRIPTION OF THE DRAWINGS

Similar reference numerals refer to similar parts through-out the several views of the drawings.

DESCRIPTION OF THE PREFERRED EMBODIMENT

Figure 1:
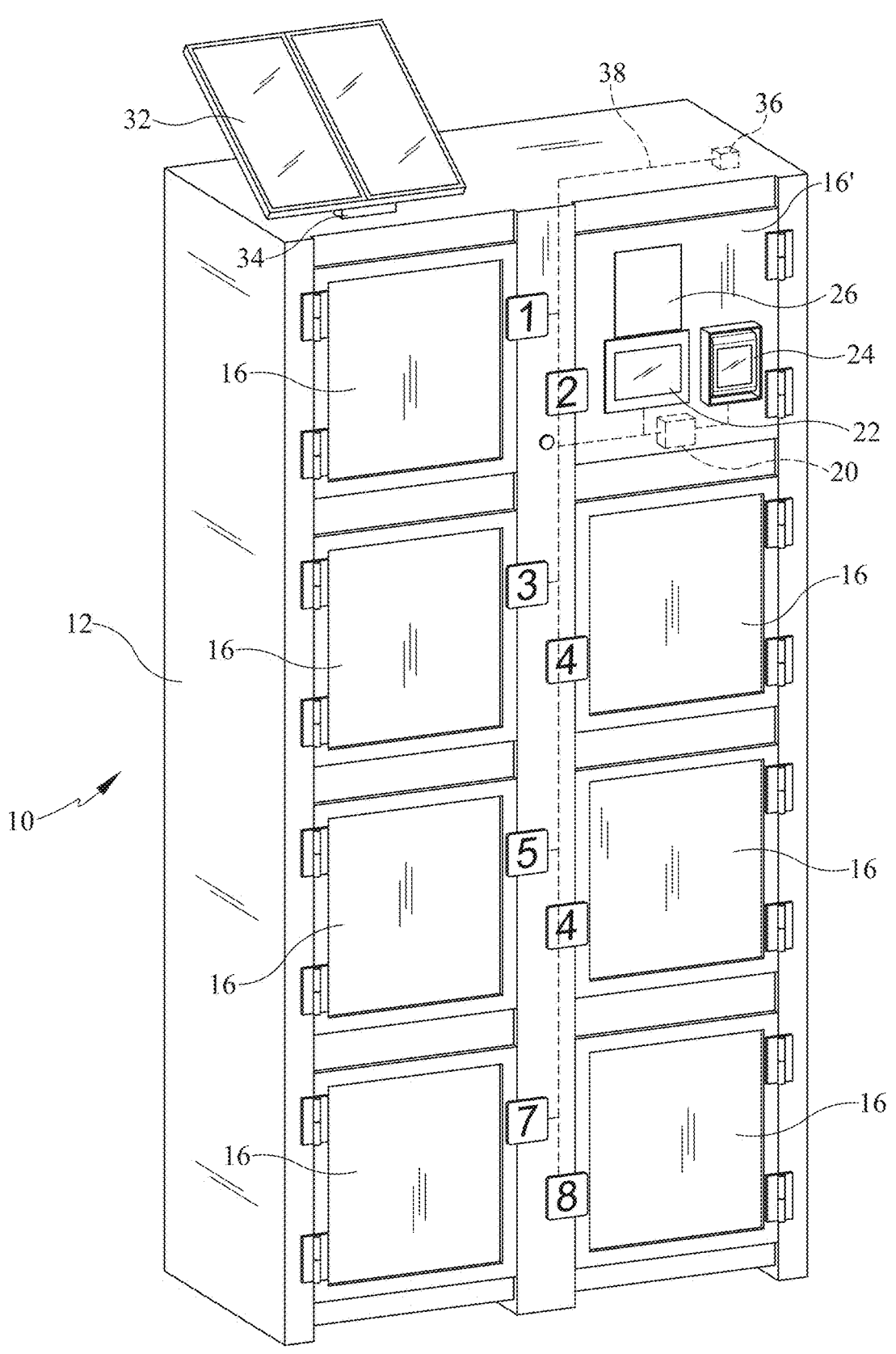
FIG. 1 is a perspective view of the standalone solar powered feed and seed vending system of the present invention.
Figure 2:
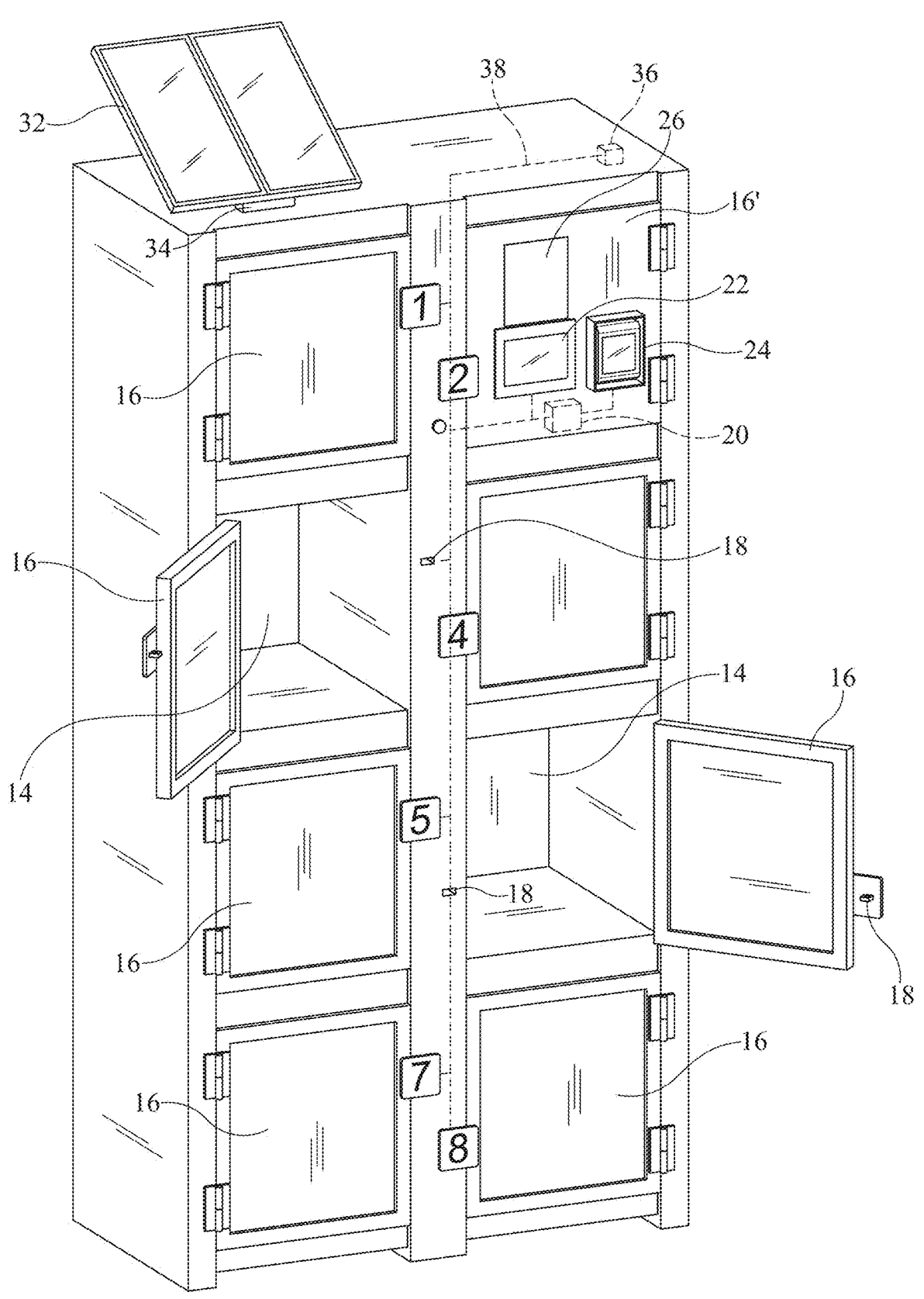
FIG. 2 is a perspective view of the standalone solar powered feed and seed vending system with a couple of the compartments open and accessible.
Figure 3:
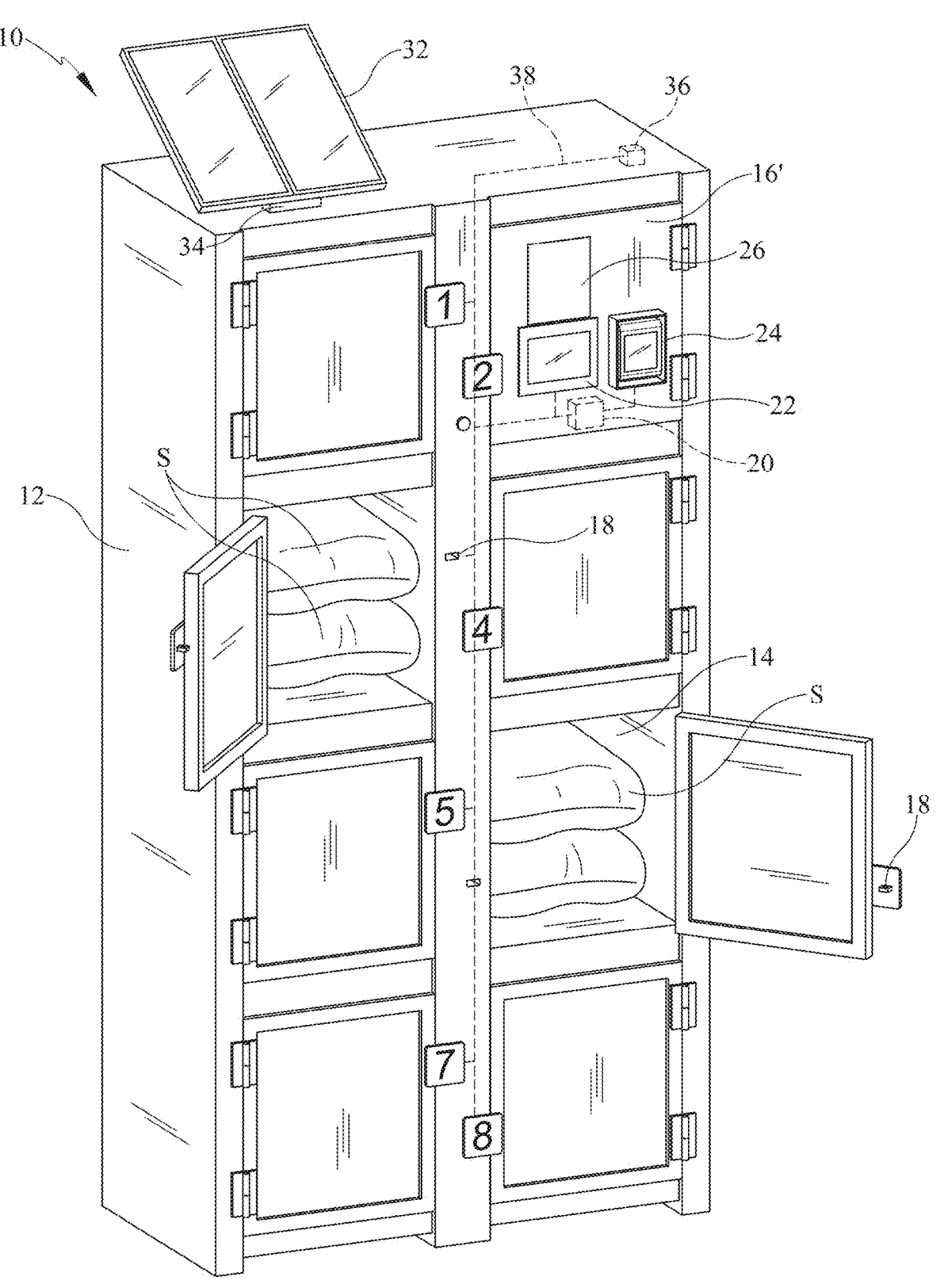
FIG. 3 is a perspective view of the standalone solar powered feed and seed vending system with a couple of the compartments open and populated.
Figure 4:
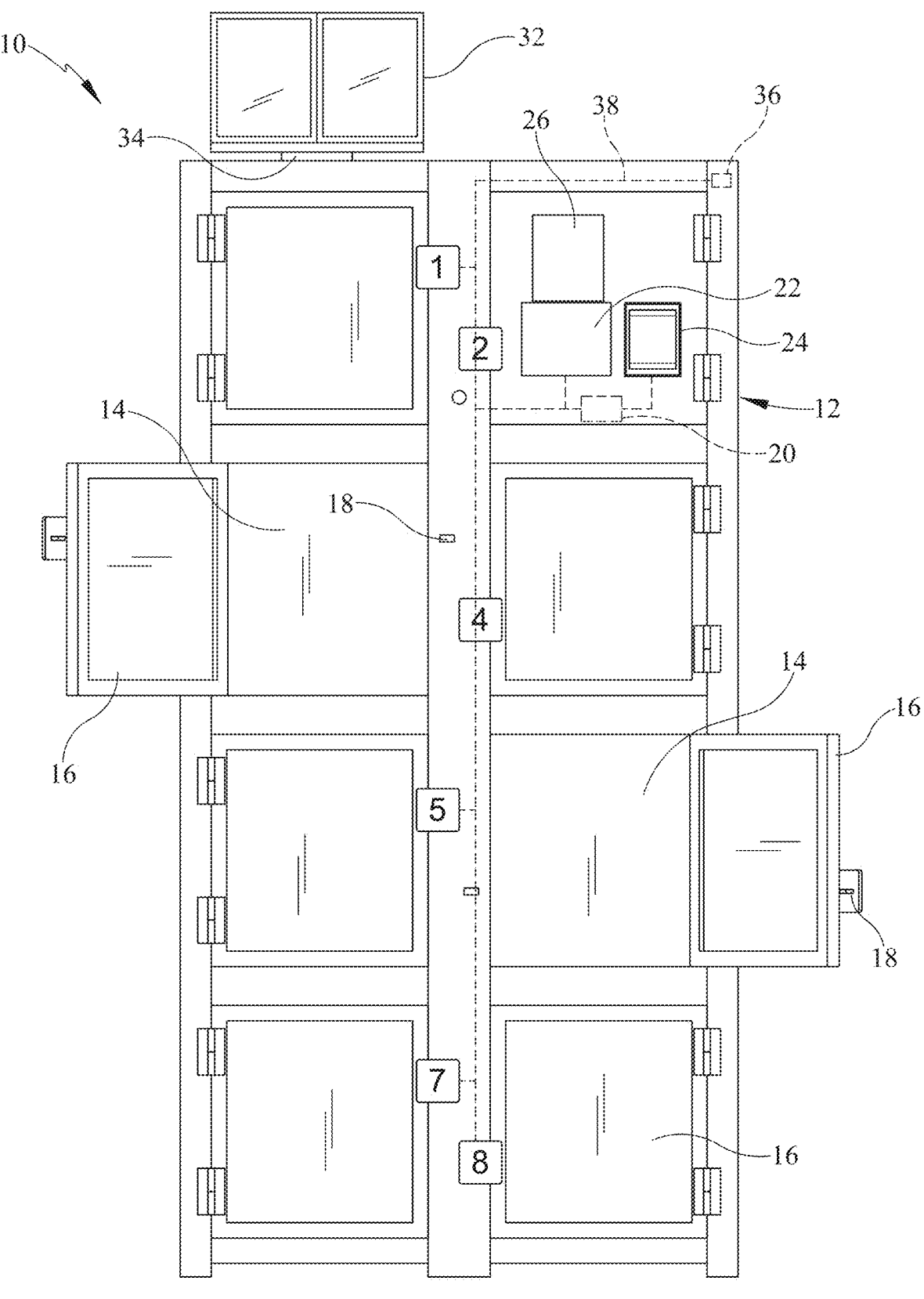
FIG. 4 is a front elevation view of the standalone solar powered feed and seed vending system of FIG. 2.

Referring now to the drawings, it is seen that the stand-alone solar powered feed and seed vending system of the present invention, generally denoted by reference numeral 10, is comprised of a cabinet type of housing module 12 having multiple compartments 14. Each compartment 14 is accessible through a door 16 that is held closed via a locking system such as the illustrated lockable latch system 18 of any appropriate design such as a magnetic lock system. In case of a power failure to the standalone solar powered feed and seed vending system 10, the default is locked for each of the locking systems so that the doors 16 remain locked to help prevent theft.

One of the compartments holds the control system 20 of the standalone solar powered feed and seed vending system 10. The control system 20 has a screen 22, which may be touch screen or may have a separate input keyboard (not illustrated), and a payment module 24 which may be in the form of a typical credit card (including debit card) swipe machine as illustrated. A cash acceptor (not illustrated) can also be provided for truly remote usage. An appropriate instruction sheet 26 can be affixed to the door 16' of this compartment 14 for giving instructions on use of the stand-alone solar powered feed and seed vending system 10. The control system 20 is held within this compartment 14 and is connected to the screen 22, the payment module 24, and each of the lockable latches 18 of the other compartments 14. Electrical power for the control system 20 and for operation of the latches 18 is provided by a solar system 32 that has a battery 34 such that the solar system 32 recharges the battery 34 as appropriate. While the battery 34 powers the various systems, the solar system 34 charges the battery 34 during appropriate daylight hours. This assures that the standalone solar powered feed and seed vending system 10 can operate during all hours with an appropriately sized battery 34 and solar system 32 to charge the battery 34. This allows the unit to be placed in most locations without the need to have a hardwired electrical connection which oth-erwise restricts the locations the unit can be installed at, requires skilled labor to install, and otherwise, increases the costs of installing the device. Even if the standalone solar powered feed and seed vending system 10 is positioned close to an electrical grid, there is no need to connect to the grid which makes installation quicker and easier. This also eliminates the need to meter and calculate energy usage and costs if the unit were using someone other than the device owner's electricity to power the unit. It also eliminates the possibility of the unit becoming inoperable due to power surges on the grid or lightning strikes. An operator of the unit can even pull off the side of the road and operate the unit so long as there is a reliable connection to the payment pro-cessing system (or can rely on cash only if a reliable connection is not available).

In order to use the standalone solar powered feed and seed vending system 10 of the present invention, the operator of the system loads each compartment 14 with appropriate seed and/or feed S or other similar items. Once each compartment 14 is populated, its door 16 is closed with the latch system 18 locking the door 16 in the closed position. After each compartment 14 is similarly loaded, the operator programs the control system 20 by identifying the contents S of each compartment 14 and their price and the system is ready for the end user. The end user approaches the standalone solar powered feed and seed vending system 10, touches the screen 22 to awake the system, and uses the screen 22 (and keyboard if so configured) to pull up, via appropriate menus, the contents of each compartment 14 as previously pro-grammed in by the operator. Once the user identifies which compartment 14 he or she desires the contents of, the user makes payment for the contents. Payment is made by swiping or scanning a credit card via the payment module 24 or via the screen 22, the payment module 24 being con-nected to a payment processing system in the usual way (cellular, WiFi (if available), etc.)—as mentioned, a cash acceptor can also be utilized as well as having the ability for stored accounts so that a user enters their account info (user name and password, etc., to make appropriate compensation for their desired purchase. Once the control system 20 verifies that payment has been made (if payment is declined, the user is so informed via the screen 22), the control system 20 sends an appropriate signal to the latch system 18 of the compartment 14 selected and paid for the latch system 18 to release and thereby unlock the door 16. The user opens the unlocked door 16 and retrieves the contents from the com-partment 14. The standalone solar powered feed and seed vending system 10 logic "notes" that the particular com-partment 14 has had its contents sold so that it does not sell them again so that if a user attempts to inadvertently purchase from the just sold compartment 14, the standalone solar powered feed and seed vending system 10 recognizes this and prevents such a sale and appropriately advises the user to make a different purchase via an appropriate mes-sage. Once an operator restocks the standalone solar pow-ered feed and seed vending system 10, the system is reset so that it once again can sell the now restocked compartment 14.

Figure 5:
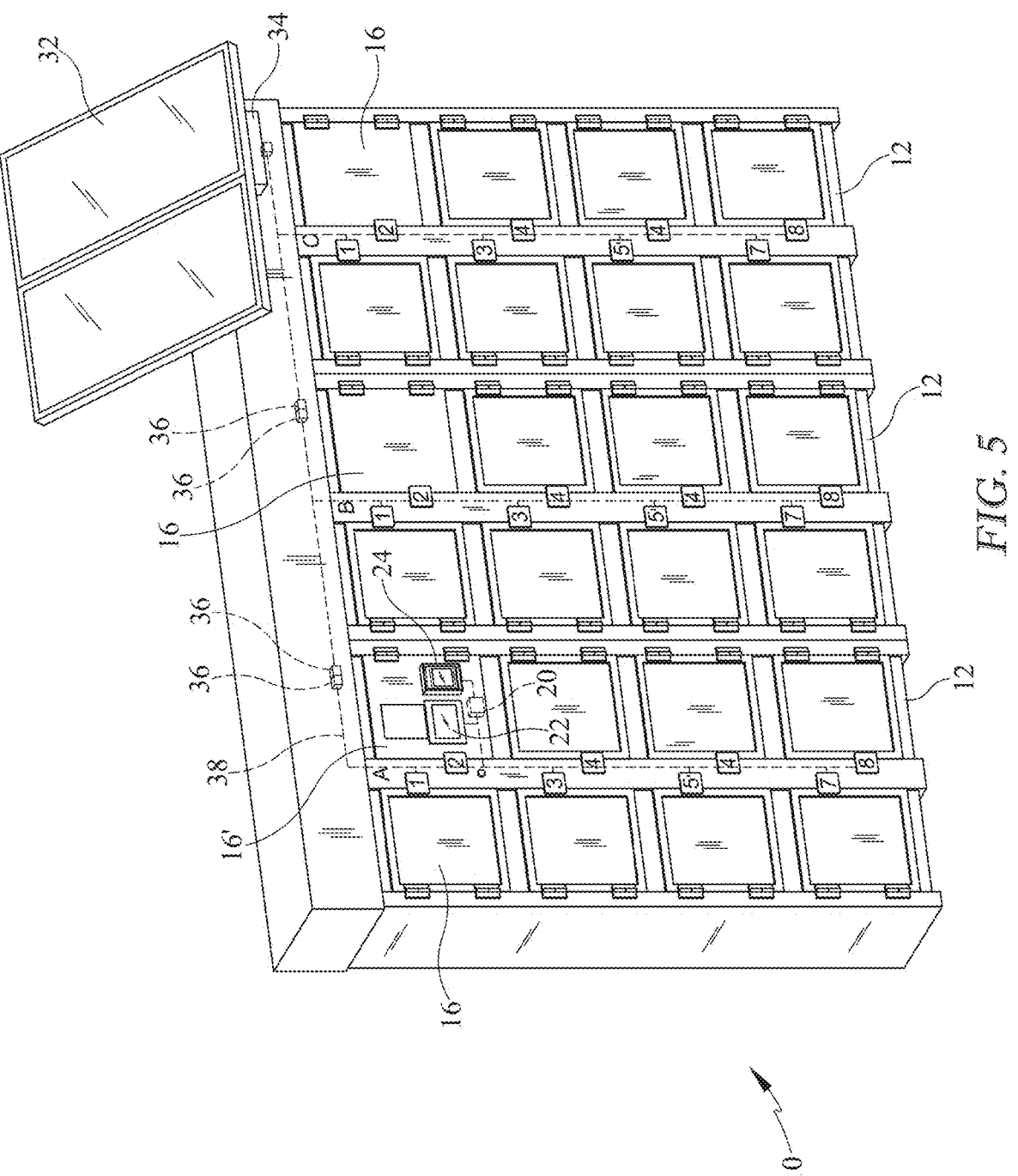
FIG. 5 is a perspective view of the standalone solar powered feed and seed vending system with multiple modules chained together.

As seen in FIG. 5, two or more housing modules 12 can be chained together so that a single control system 20 controls all of the housing modules 12 so chained together. The modules 12 are physically attached to each other in appropriate fashion for stability of the overall system and each housing module 12 is plugged into its neighboring housing modules 12 via an appropriate plug system 36 in order to allow the control system 20 located on one of the housing modules 12 to be able to communicate with all the latches 18 on all of the housing modules 12 across a common bus 38. Logic within the control system 20 allows the control system 20 to be able to identify the fact that additional housing modules 12 have been connected to the first housing module 12 so that the control system 20 can control all of the housing modules 12 so connected without the need to reprogram the system. More than 3 modules can be configured to operate under a single control system 20.

While the invention has been particularly shown and described with reference to an embodiment thereof, it will be appreciated by those skilled in the art that various changes in form and detail may be made without departing from the spirit and scope of the invention.

I claim:

1. A vending system comprising:
   a first housing module having a first compartment and a series of second compartments each second compart-ment having a door covering its opening, each door articulable between an open position allowing access into the second compartment associated with the door and a closed position prohibiting access into the second compartment associated with the door, each door hav-ing a locking system, the locking system having a locked mode for locking the door when the door is in the closed position and an unlocked mode for unlocking the door, each second compartment adapted to hold an item for sale therein, each item for sale having a unique price associated with the item for sale, this unique price also associated with the second compartment holding that particular item for sale, and each item for sale accessible for retrieval from its compartment via the door for that particular compartment being placed into an open position;

a control system disposed within the first compartment and communicatively coupled to each of the locking systems;

a payment verification subsystem communicatively coupled to the control system;

a battery connected to each latching system for electrically powering the latching system and the battery connected to the control system for electrically powering the control system, the battery also connected to the payment verification subsystem;

a solar panel connected to the battery for electrically recharging the battery; and whenever a particular second compartment is selected via the control system, the control system determines the particular price associated with the selected second compartment the payment verification subsystem verifies that a payment has been made that is equal to the price and communicates this fact to the control system wherein the control system sends a signal to the locking system associated with the selected second compartment to thereby place the locking system of that second compartment into its unlocked mode.

2. The vending system as in claim 1 wherein the control system is controlled via a screen communicatively coupled to the control system.

3. The vending system as in claim 1 wherein after the particular second compartment is selected via the control system, the particular second compartment cannot be again selected by the control system until the control system receives a reset signal.

4. A vending system comprising:

a first housing module having a first compartment and a series of second compartments each second compartment having a first door covering its opening, each first door articulable between a first open position allowing access into the second compartment associated with the first door and a first closed position prohibiting access into the second compartment associated with the first door, each first door having a first locking system, the first locking system having a first locked mode for locking the first door when the first door is in the first closed position and a first unlocked mode for unlocking the first door, each second compartment adapted to hold an item for sale therein, each item for sale having a unique price associated with the item for sale, this unique price also associated with the second compartment holding that particular item for sale, and each item for sale accessible for retrieval from its second compartment via the door for that particular second compartment being placed into the first open position;

a second housing module having a series of third compartments each third compartment having a second door covering its opening, each second door articulable between a second open position allowing access into the third compartment associated with the second door and a second closed position prohibiting access into the third compartment associated with the second door, each first door having a first locking system, the first locking system having a first locked mode for locking the first door when the second door is in the second closed position and a first unlocked mode for unlocking the first door, each third compartment also adapted to hold an item for sale therein, each item for sale having a unique price associated with the item for sale, this unique price also associated with the third compartment holding that particular item for sale, and each item for sale accessible for retrieval from its third compartment via the second door for that particular third compartment being placed into the second open position;

a second housing module having a series of third compartments each third compartment having a second door covering its opening, each second door having a second locking system, the second locking system having a second locked mode for locking the second door and a second unlocked mode for unlocking the second door;

a control system disposed within the first compartment and electrically coupled to each of the first locking systems and to each of the second locking systems;

a battery connected to each latching system for electrically powering the latching system and the battery connected to the control system for electrically powering the control system, the battery also connected to the payment verification subsystem;

a solar panel connected to the battery for electrically recharging the battery;

a payment verification subsystem communicatively coupled to the control system; and whenever a particular second compartment or a particular third compartment is selected via the control system, the control system determines the particular price associated with the selected second compartment or third compartment, the payment verification subsystem verifies that a payment has been made that is equal to the price and communicates this fact to the control system wherein the control system sends a signal to the either the first locking system associated with the selected second compartment to thereby place the first locking system of that second compartment into its first unlocked mode or to the second locking system associated with the selected third compartment to thereby place the second locking system of that third compartment into its second unlocked mode.

5. The vending system as in claim 3 wherein the control system is controlled via a screen communicatively coupled to the control system.

6. The vending system as in claim 4 wherein after the particular second compartment is selected via the control system, the particular second compartment cannot be again selected by the control system until the control system receives a reset signal.

* * * * *